United States Patent
Shi et al.

(10) Patent No.: US 10,225,757 B2
(45) Date of Patent: Mar. 5, 2019

(54) METHODS AND APPARATUSES FOR ENABLING USE OF UN-LICENSED FREQUENCY BAND

(71) Applicant: Telefonaktiebolaget LM Ericsson (publ), Stockholm (SE)

(72) Inventors: Cong Shi, Beijing (CN); Gen Li, Beijing (CN); Qingyu Miao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 232 days.

(21) Appl. No.: 15/311,935

(22) PCT Filed: May 28, 2014

(86) PCT No.: PCT/CN2014/078668
§ 371 (c)(1),
(2) Date: Nov. 17, 2016

(87) PCT Pub. No.: WO2015/180075
PCT Pub. Date: Dec. 3, 2015

(65) Prior Publication Data
US 2017/0094550 A1    Mar. 30, 2017

(51) Int. Cl.
*H04W 24/10* (2009.01)
*H04W 16/14* (2009.01)
*H04W 24/02* (2009.01)

(52) U.S. Cl.
CPC ......... *H04W 24/10* (2013.01); *H04W 16/14* (2013.01); *H04W 24/02* (2013.01)

(58) Field of Classification Search
CPC ..... H04W 24/02; H04W 24/10; H04W 16/24; H04W 16/14
See application file for complete search history.

(56) References Cited

U.S. PATENT DOCUMENTS

| 2006/0270411 | A1 | 11/2006 | Grayson |
| 2012/0250631 | A1 | 10/2012 | Hakola et al. |
| 2013/0336156 | A1 | 12/2013 | Wei et al. |

(Continued)

FOREIGN PATENT DOCUMENTS

| WO | 2013023377 A1 | 2/2013 |
| WO | 2013071488 A1 | 5/2013 |
| WO | 2013143053 A1 | 10/2013 |

OTHER PUBLICATIONS

CMCC, et al., "RP-132085: New SID: Study on Unlicensed Spectrum Integration to LTE," 3rd Generation Partnership Project (3GPP), Work Item Description, TSG RAN Meeting #62, Dec. 3-6, 2013, 5 pages, Busan, Korea.

(Continued)

*Primary Examiner* — Paul H Masur
(74) *Attorney, Agent, or Firm* — Sage Patent Group

(57) ABSTRACT

The present exemplary embodiments relate to methods, an LTE eNB and a UE for enabling the use of a down-link carrier of an un-licensed frequency band. The eNB is adapted to configure at least one served UE to perform measurement(s) on the un-licensed frequency band and to report to the eNB. Based on the measurement report, the eNB decides whether or not to use the downlink carrier of the un-licensed frequency band. The embodiments also relates to a UE and a method in a UE.

8 Claims, 10 Drawing Sheets

(56) References Cited

U.S. PATENT DOCUMENTS

| | | | | |
|---|---|---|---|---|
| 2014/0204791 A1* | 7/2014 | Teng | ............... | H04W 16/14 370/252 |
| 2015/0156650 A1* | 6/2015 | Li | ............... | H04W 72/085 455/67.11 |
| 2015/0334599 A1* | 11/2015 | Maaref | ............ | H04L 5/0041 370/236 |
| 2016/0330669 A1* | 11/2016 | Li | ............... | H04W 16/14 |
| 2017/0048721 A1* | 2/2017 | Sun | ............... | H04W 16/16 |

OTHER PUBLICATIONS

Ericsson, et al., "RP-131788: Study on LTE Evolution for Unlicensed Spectrum Deployments," 3rd Generation Partnership Project (3GPP), Work Item Description, TSG RAN Meeting #62, Nov. 26, 2013, 5 pages.

Report and Order and Momorandum Opinion and Order, Federal Communications Commission (FCC) 05-56, Mar. 16, 2005, 69 pages.

International Search Report for International Patent Application No. PCT/CN2014/078668, dated Feb. 26, 2015, 3 pages.

Rahman, Muhammad Imadur, et al., "License-exempt LTE systems for secondary spectrum usage: scenarios and first assessment," IEEE International Symposium on Dynamic Spectrum Access Networks, May 3-6, 2011, pp. 349-358, Piscataway, NJ.

Extended European Search Report for European Patent Application No. 14893062.1, dated Nov. 16, 2017, 14 pages.

\* cited by examiner

METHODS AND APPARATUSES FOR ENABLING USE OF UN-LICENSED FREQUENCY BAND

This application is a 35 U.S.C. § 371 national phase filing of International Application No. PCT/CN2014/078668, filed May 28, 2014, the disclosure of which is incorporated herein by reference in its entirety.

TECHNICAL FIELD

The present technology relates to wireless communications in general and in particular to methods and apparatuses for enabling use un-licensed frequency band in a wireless communication network.

BACKGROUND

The massive growth in mobile broadband data traffic has driven the evolution of the cellular systems to meet the tremendous need for increased capacity. However, the traffic growth will be difficult to address with spectrum currently available for Long Term Evolution, LTE, systems, especially for the valuable bands with low propagation loss below 6 GHz. The licensed band is superior, from the quality and availability perspective, but scarce and expensive, especially below 6 GHz. Given the fact that the current amount of un-licensed spectrum is comparable to the amount of licensed spectrum, and the fact that in some regions, more un-licensed spectrum is planned to be allocated, it is natural for operators to look into the potential of utilizing un-licensed spectrum to meet the traffic growth demands.

In 3GPP (3rd Generation Partnership Project) studies on supporting LTE in un-licensed spectrum are likely to take place, focusing on low-power nodes. The basic set-up is "licensed-assisted access" with carrier aggregation, CA, between licensed and un-licensed carriers. A licensed LTE carrier is used for all mobility, control signalling and parts of the user data, while one or more carriers in un-licensed spectrum are used to boost the user-data performance.

The basic IEEE 802.11 MAC employs a Carrier Sense Multiple Access with Collision Avoidance based MAC. The same protocol is applied by all stations, including the access point, i.e. in both downlink and uplink. A station that wishes to transmit a packet first senses the medium. If the medium is sensed idle for a certain minimum time, a so-called Distributed Inter Frame Space, DIFS, (50 µs for IEEE 802.11b), the packet is transmitted. If the medium is busy, the station first defers until the medium is sensed idle. Hence that different transmission points will compete to transmit on the shared channel and a package data unit is not transmitted in predefined time point. Since base stations e.g. evolved NodeBs (eNBs) in LTE systems do not currently have the capability of performing measurement on the un-licensed frequency band, the fairness between different systems operating in the same un-licensed frequency band will not be guaranteed.

SUMMARY

The addressed problem in this disclosure is how to obtain necessary information at an LTE eNB operating a downlink carrier of un-licensed frequency band without receive RF chains for that band.

According to one aspect, the problem is solved by means of a method in an eNB of an LTE system. Said method and embodiments thereof, enables the use of a downlink carrier of an un-licensed frequency band by determining a measurement configuration for at least one user equipment, UE, served by the eNB and by sending on a licensed frequency band the measurement configuration to said at least one UE. The method further comprises the steps of receiving on the licensed frequency band a measurement report from the at least one UE, and deciding to use a downlink carrier of an un-licensed frequency band based on the received measurement report.

According to another aspect, the problem is solved by means of a method in a UE, in an LTE system. Said method and embodiments thereof enables UE assisted measurement of an un-licensed frequency band to be used for at least one downlink carrier by receiving measurement configuration from a serving eNB, on a licensed frequency band, and by measuring of the un-licensed frequency band in accordance with the received measurement configuration. The method further comprises the steps of generating a measurement report for said un-licensed frequency band, and sending the measurement report on the licensed frequency band.

According to yet another aspect, the problem is solved by means of an eNB of an LTE system. The eNB, and embodiments thereof, enables the use of a downlink carrier of an un-licensed frequency band. To achieve the object, said eNB is provided with a processing circuitry, which is operative to determine a measurement configuration for at least one UE served by the eNB, to send on a licensed frequency band the measurement configuration to said at least one UE, to receive on the licensed frequency band a measurement report from the at least one UE, and to decide to use a downlink carrier of an un-licensed frequency band based on the received measurement report.

According to an additional object, it is also provided a UE, for performing UE assisted measurement of an un-licensed frequency band to be used for at least one downlink carrier in an LTE system. Said UE, and embodiments thereof, comprises a processing circuitry being operative to receive measurement configuration from a serving eNB on a licensed frequency band, to measure of the un-licensed frequency band in accordance with the received measurement configuration, to generate a measurement report for said un-licensed frequency band, and to send the measurement report on the licensed frequency band.

The processing circuitry may be implemented by a processor and a memory, wherein said memory contains instructions executable by said processor for performing the steps of the above described methods.

Different embodiments of the above aspects are stated in the enclosed dependent claims.

The advantages achieved by the described exemplary embodiments herein include:

To use the downlink un-licensed frequency band, no extra functionality on the LTE eNB is needed, which means less impact on the existing LTE specifications.

Fairness in sharing could be achieved between LTE and other systems, e.g. WiFi, which also use the same un-licensed frequency band.

BRIEF DESCRIPTION OF THE DRAWINGS

The foregoing, and other, objects, features and advantages of the present technology will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present technology.

In the following description, a first method S100 performed in a base station eNB of an LTE system and a second method S200 in a UE, are described and discussed, as well as a base station eNB adapted to perform said first method and a UE adapted to perform said second method.

Throughout this description, drawings and claims, the abbreviations eNB or LTE eNB are used meaning a base station eNB, i.e. as eNodeB, in an LTE system. An UE is here any communication device operating in the radio frequency region, e.g. smart phones, lap tops, mobile terminals, tablets, Ipads, etc.

Figure 1:
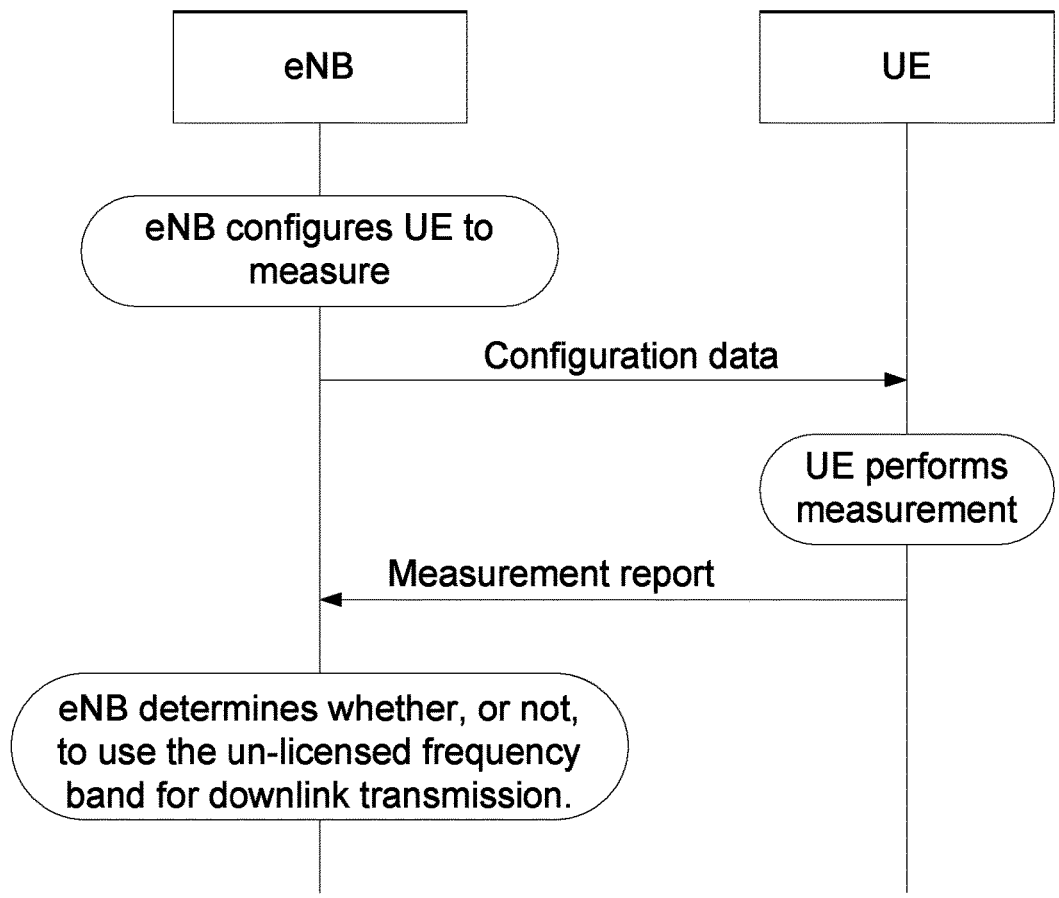
FIG. 1 is a signalling diagram illustrating the flow of messages between an LTE eNB and a UE in accordance with embodiments herein.

FIG. 1 is a signalling diagram illustrating the flow of messages between an LTE eNB and a UE.

It is proposed herein that an eNB in an LTE system working in un-licensed frequency band, e.g. as a supplement downlink will configure its UEs to perform measurement of said un-licensed frequency band. The procedures can be listed as follows:

eNB configuration for UE measurement

UE measurement to identify environment, i.e. other interfering systems operating in the Radio Frequency band of interest UE report measurement results in a report to eNB eNB determines whether, or not, to use the downlink carrier of an un-licensed frequency band.

The procedure is illustrated in FIG. 1, and the detail of each part is described in the following:

the eNB determines a measurement configuration for at least one UE;

the eNB sends on a licensed frequency band the measurement configuration to said at least one UE;

the UE performs measurement on a indicated un-licensed frequency band as indicated by the eNB in the measurement configuration;

the UE generates a measurement report and sends the measurement report on a licensed frequency band;

the eNB receives on the licensed frequency band the measurement report from the at least one UE;

The eNB decides whether, or not, to use the un-licensed frequency band for a downlink carrier based on the received measurement report.

Different embodiments of methods, and eNB and UE for supporting said methods to enable the signalling flow discussed above and illustrated in FIG. 1 will hereafter be explained in the following disclosure with reference to enclosed drawings.

The licensed LTE carrier may be, e.g. LTE Frequency Division Duplexing, FDD, or LTE Time Division Duplexing, TDD, and the un-licensed carrier may either be an LTE FDD supplemental downlink carrier or an LTE TDD carrier. Both single and multi-operator scenarios, including the case where multiple operators deploy LTE in the same intervals of un-licensed spectrum, are being taken into consideration.

The licensed LTE carrier could be LTE FDD or LTE TDD, wherein LTE FDD is used for illustration. The un-licensed carrier may be an LTE FDD supplemental downlink. The un-licensed frequency band could be shared by other systems, for example, the WiFi system or other LTE systems using the similar Carrier Aggregation operation.

Figure 2:
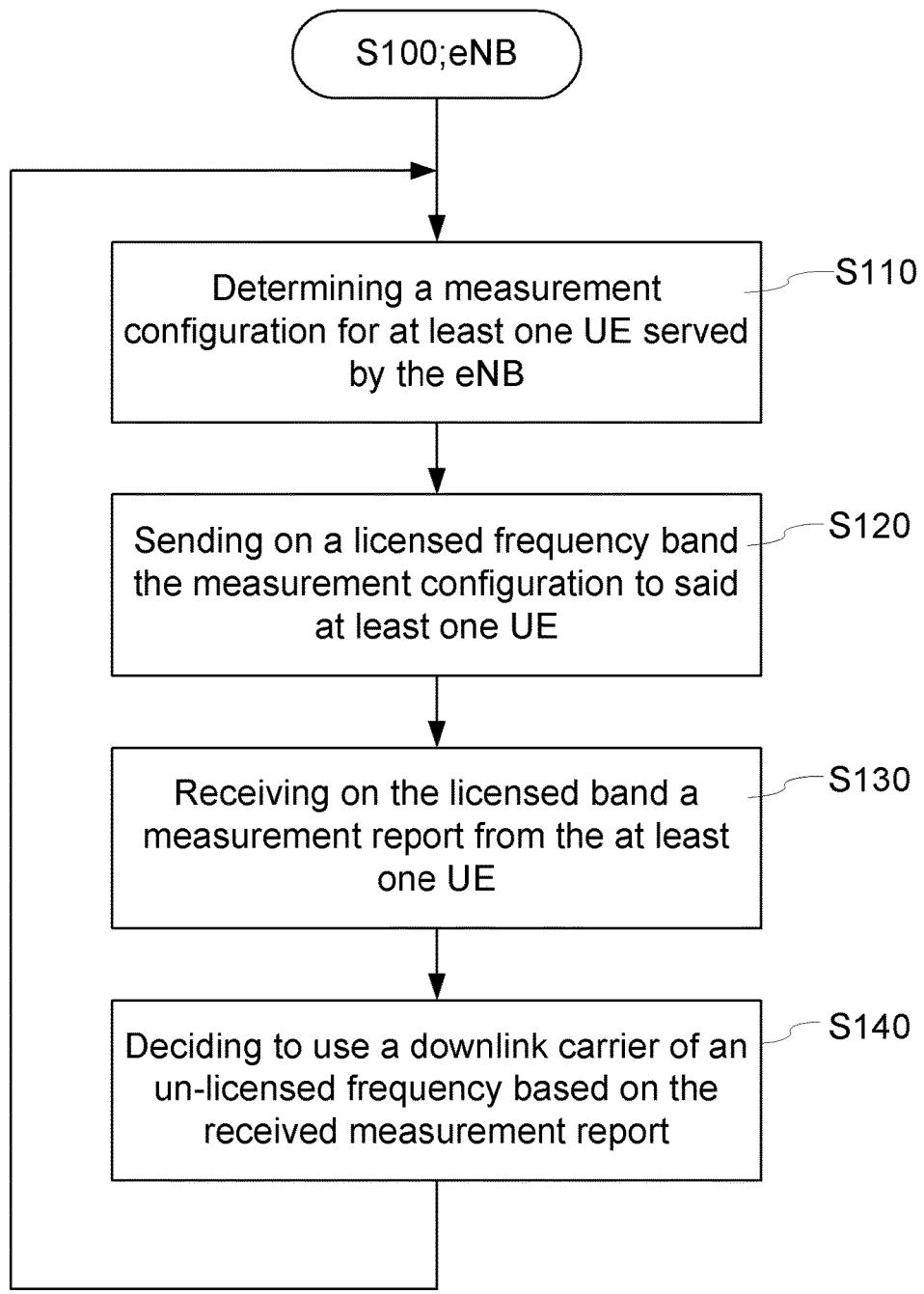
FIG. 2 is a flowchart illustrating a proposed first method performed by the LTE eNB.

FIG. 2 is a flowchart illustrating a proposed first method, S100, performed by an eNB of an LTE system for enabling the use of a downlink carrier of an un-licensed frequency band, said method including:

S110:—determining a measurement configuration for at least one UE served by the eNB;

S120:—sending on a licensed frequency band the measurement configuration to said at least one UE;

S130:—receiving on the licensed frequency band a measurement report from the at least one UE;

S140:—deciding to use a downlink carrier of an un-licensed frequency band based on the received measurement result.

Thus, in step S140 the eNB decides whether, or not, to use the un-licensed frequency band for a downlink carrier based on the received measurement result. Hence, if the un-licensed frequency band is determined to be to occupied by other radio transmission, a downlink carrier will not be established in the un-licensed frequency band.

Said step 120 supports UE assisted measurement of an un-licensed frequency band specified in the measurement configuration.

According to one embodiment of the method, step S120 may comprise:

sending on a licensed frequency band the measurement configuration to said at least one UE, wherein the measurement configuration is sent to the at least one UE via system information block signalling, layer 1, or Radio Resource Control signalling in the licensed frequency band.

The received measurement report may comprise information on detected system type, on which un-licensed frequency band measurement concerns and its corresponding interference power on the un-licensed frequency band to the eNB. The measurement report may be received on different basis, e.g. periodically or as a result of a triggering event of a UE.

The measurement period may be preconfigured, or set specifically for this eNB and optionally its neighbour eNB in the same network. An eNB is further provided which is adapted to configure all UEs or only select part of them to do measurement, or different groups of UEs perform different measurement, e.g. some UEs measure channel A while other UEs measure channel B.

Figure 3:
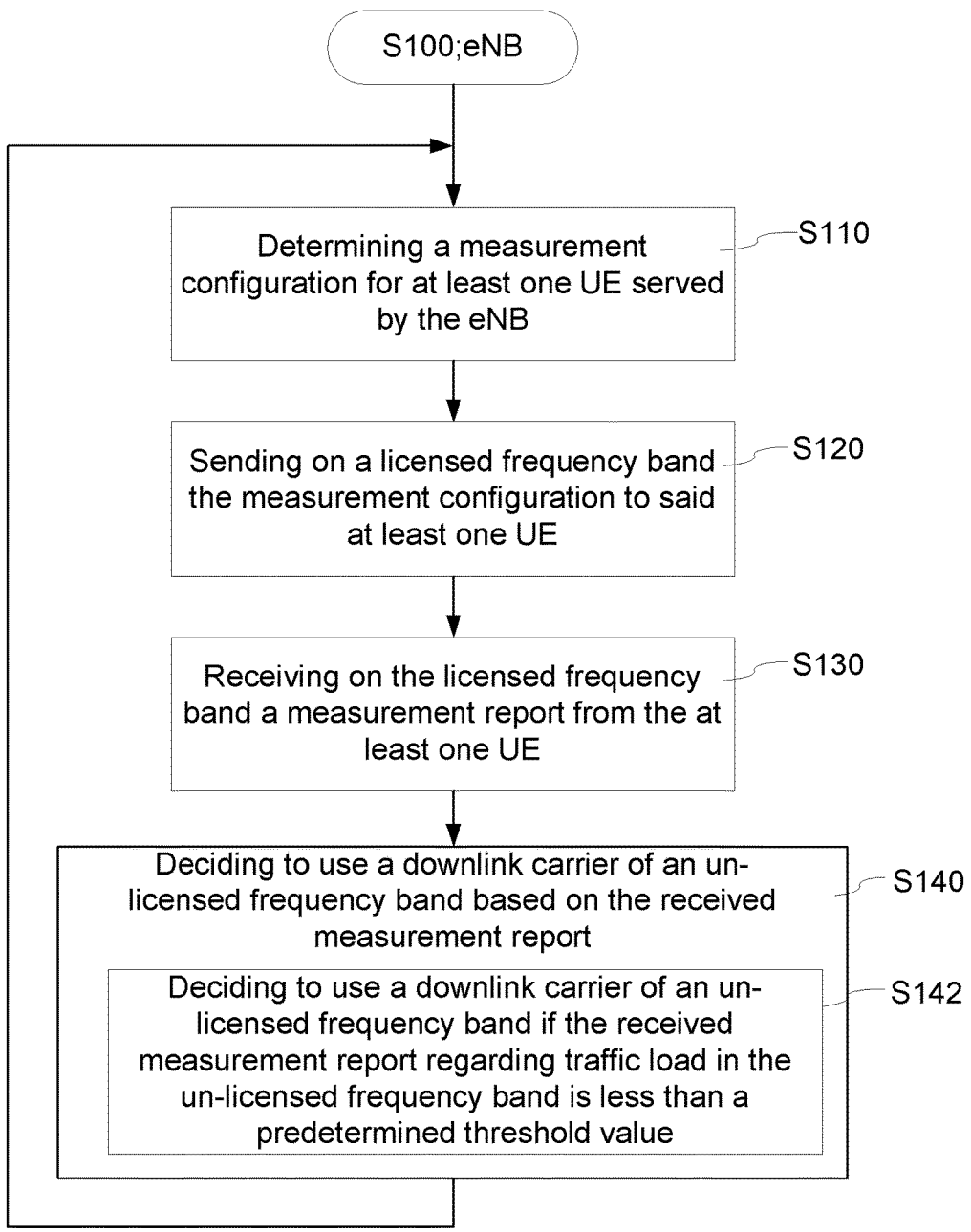
FIG. 3 is a flowchart illustrating one embodiment of the first method.

FIG. 3 is a flowchart illustrating an embodiment of the method for enabling the use of a downlink carrier of an un-licensed frequency band. The embodiment comprises steps S110, S120, S130 and S140 of the method as described above (see FIG. 2). The present embodiment comprises a step 142 in step S140:

S142:—Deciding to use the downlink carrier of an un-licensed frequency band if the received measurement report regarding traffic load in the un-licensed frequency band is less than a predetermined threshold value.

Figure 4:
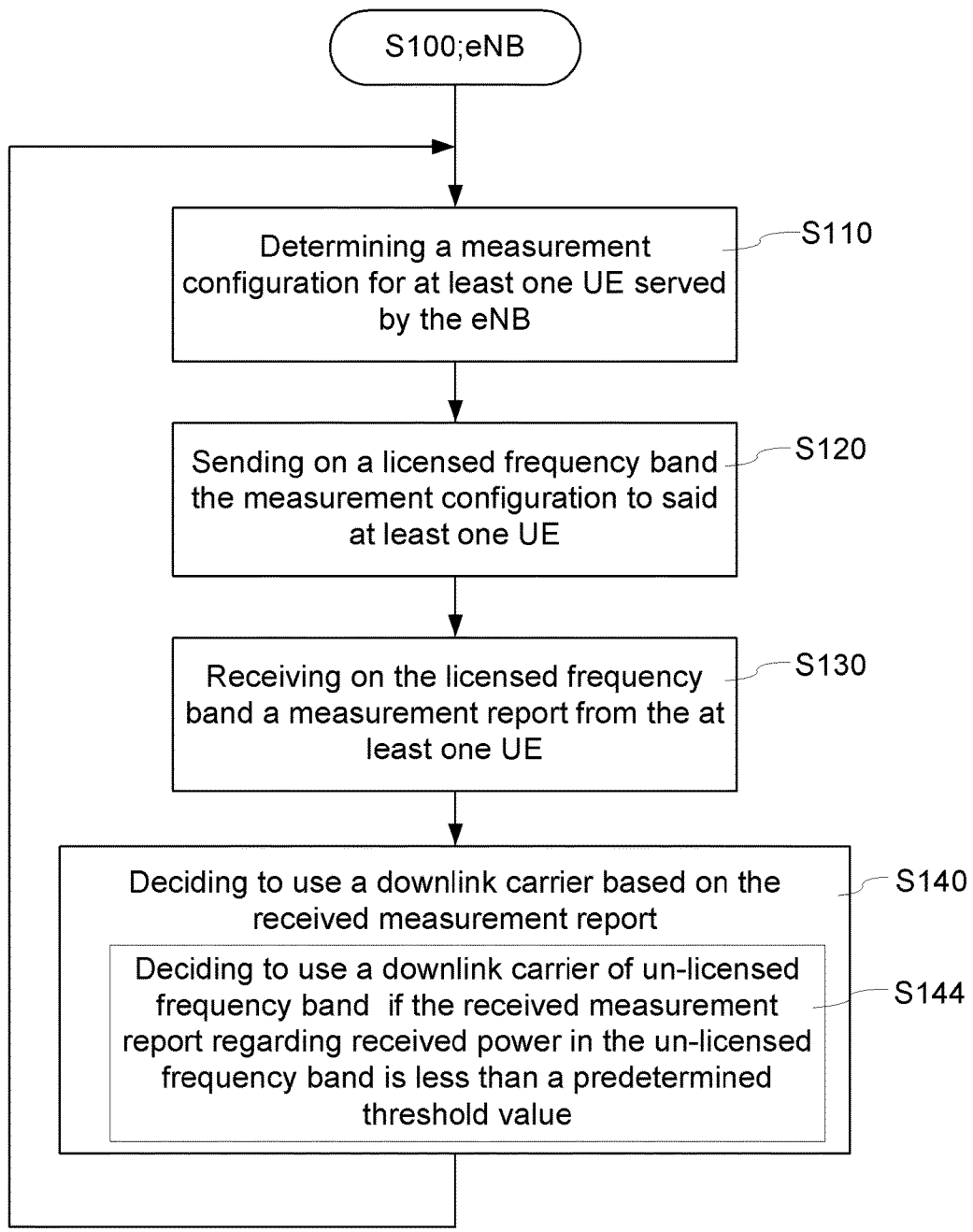
FIG. 4 is a flowchart illustrating one alternative embodiment of the first method.

FIG. 4 is a flowchart illustrating an alternative embodiment of the method for enabling the use of a downlink carrier of an un-licensed frequency band. The embodiment comprises steps S110, S120, S130 and S140 of the method as described above (see FIG. 2). The alternative embodiment comprises a step 144, instead of a step S142, in step S140:

S144:—Deciding to use the downlink carrier of an un-licensed frequency band if the received measurement report regarding received power in the un-licensed frequency band is less than predetermined threshold value.

Figure 5:
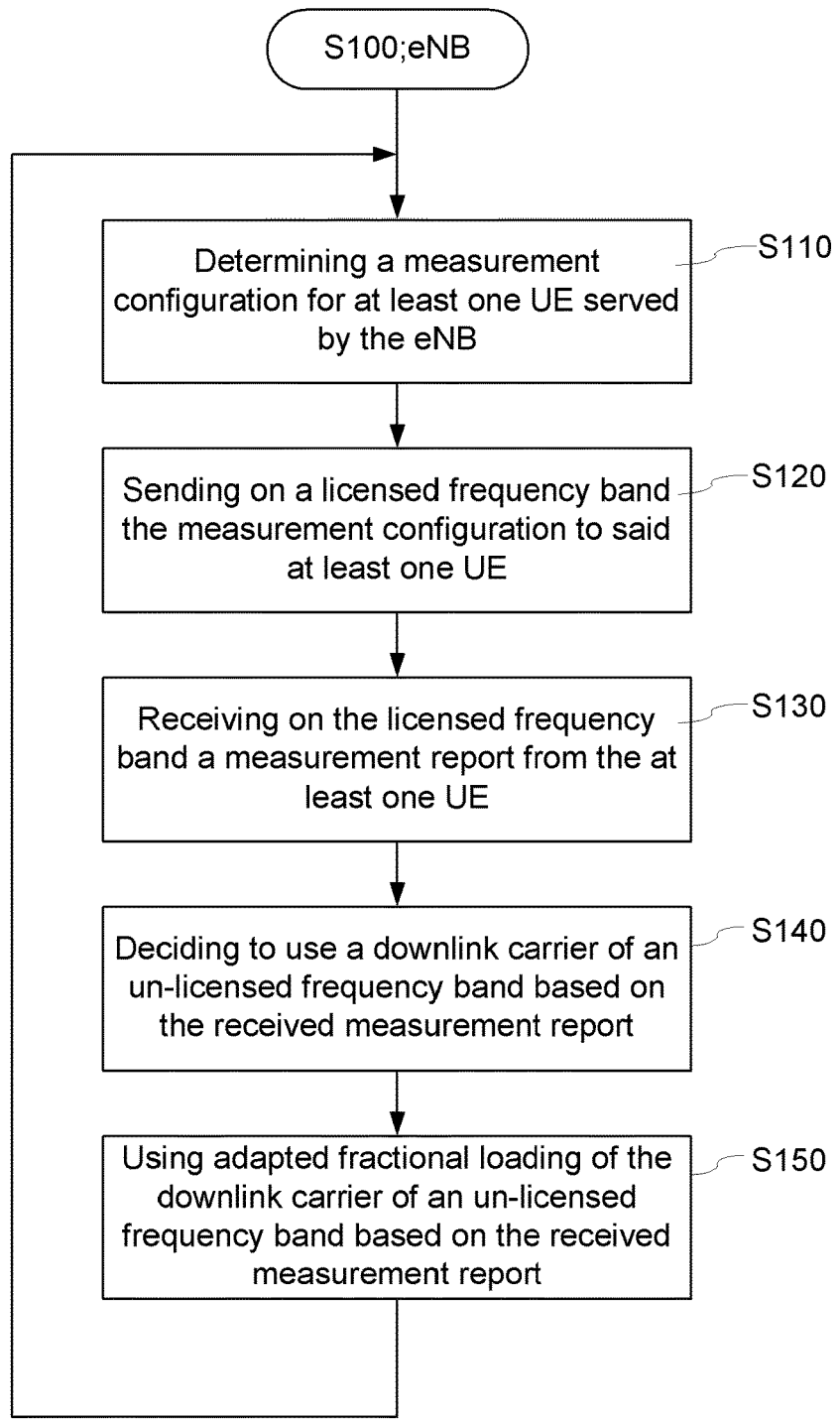
FIG. 5 is a flowchart illustrating another embodiment of the first method.

FIG. 5 is a flowchart illustrating further one embodiment of the method for enabling the use of a downlink carrier of an un-licensed frequency band. This embodiment also comprises steps S110, S120, S130 and S140 of the method, and it may also comprise step S142, or S144, as described above. The present embodiment comprises an additional step, S150.

S150:—Using adapted fractional loading of the downlink carrier of the un-licensed frequency band based on the received measurement report.

The basic idea of fractional loading is that the eNB is constrained to schedule its UEs on some frames, and other frames are blanked for fairness sharing among other systems.

According to one embodiment of the method, step S150 may comprise;

Using adapted fractional loading of the downlink carrier of the un-licensed frequency band based on the received measurement report, wherein the active subframe ratio of the downlink carrier for each UE is configured in dependence of measured interference from surrounding radio systems. The setting of fractional load should be based on the measurement of UEs, for example the energy level or the load information, if the measurement load is high on the band, then the fractional loading of the eNB should be configured low. The active subframe is that on which frames the UE is scheduled. The active subframes could be configured for different UEs, for example, UE A is configured active subframes #1 #2 and #3, and UE B is configured active subframes #5 #6.

Figure 6:
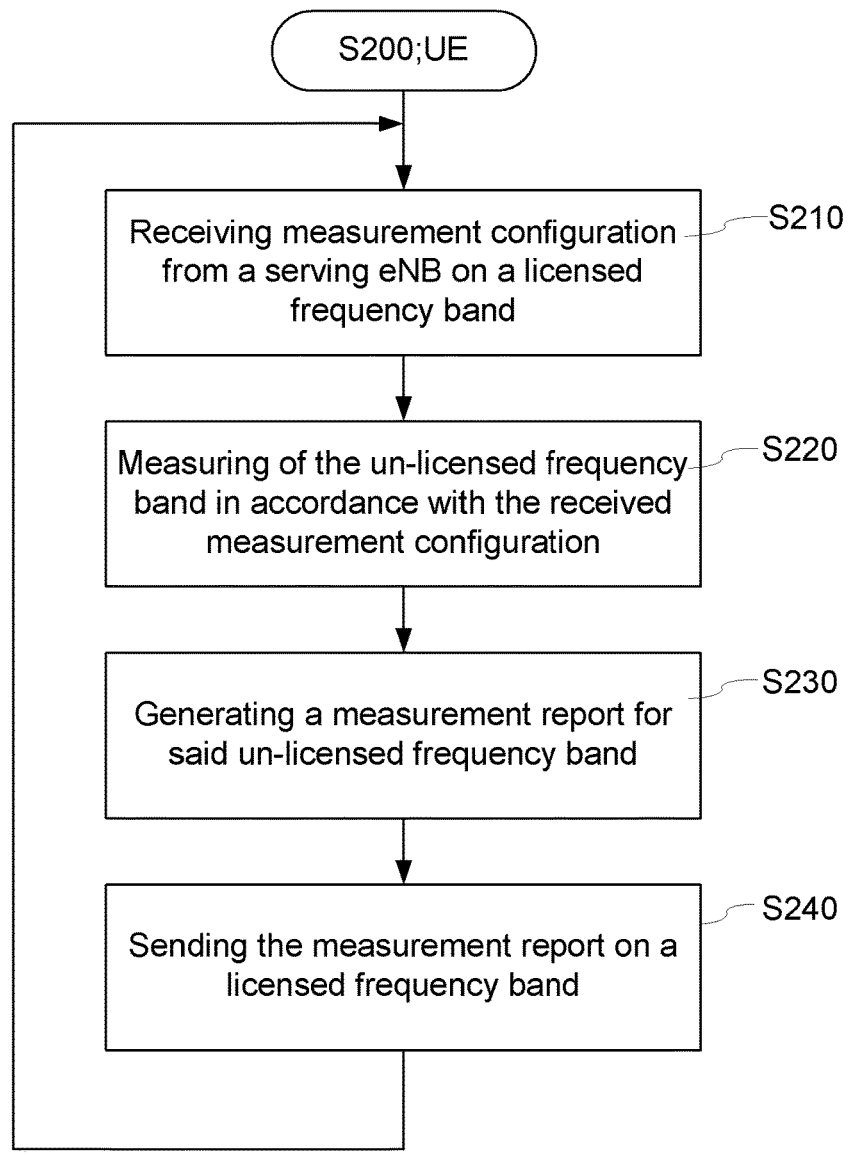
FIG. 6 is a flowchart illustrating a proposed second method performed by the UE.

FIG. 6 is a flowchart illustrating a proposed second method, S200, performed by a UE, for enabling in an LTE system UE assisted measurement of an un-licensed frequency band to be used for at least one downlink carrier. Said method comprises:

S210:—receiving measurement configuration from a serving eNB on a licensed frequency band;

S220:—measuring of the un-licensed frequency band in accordance with the received measurement configuration;

S230:—generating a measurement report for said un-licensed frequency band; and

S240:—sending the measurement report on the licensed frequency band.

In S210 is measurement configuration received from a serving eNB, i.e. an LTE eNB to which the UE for the moment is connected.

The generated measurement report may comprise information on detected system type, on which un-licensed frequency band measurement concerns and its corresponding interference power on the un-licensed frequency band to the eNB. The measurement report may be received on different basis, e.g. periodically or as a result of a triggering event of a UE.

Figure 7:
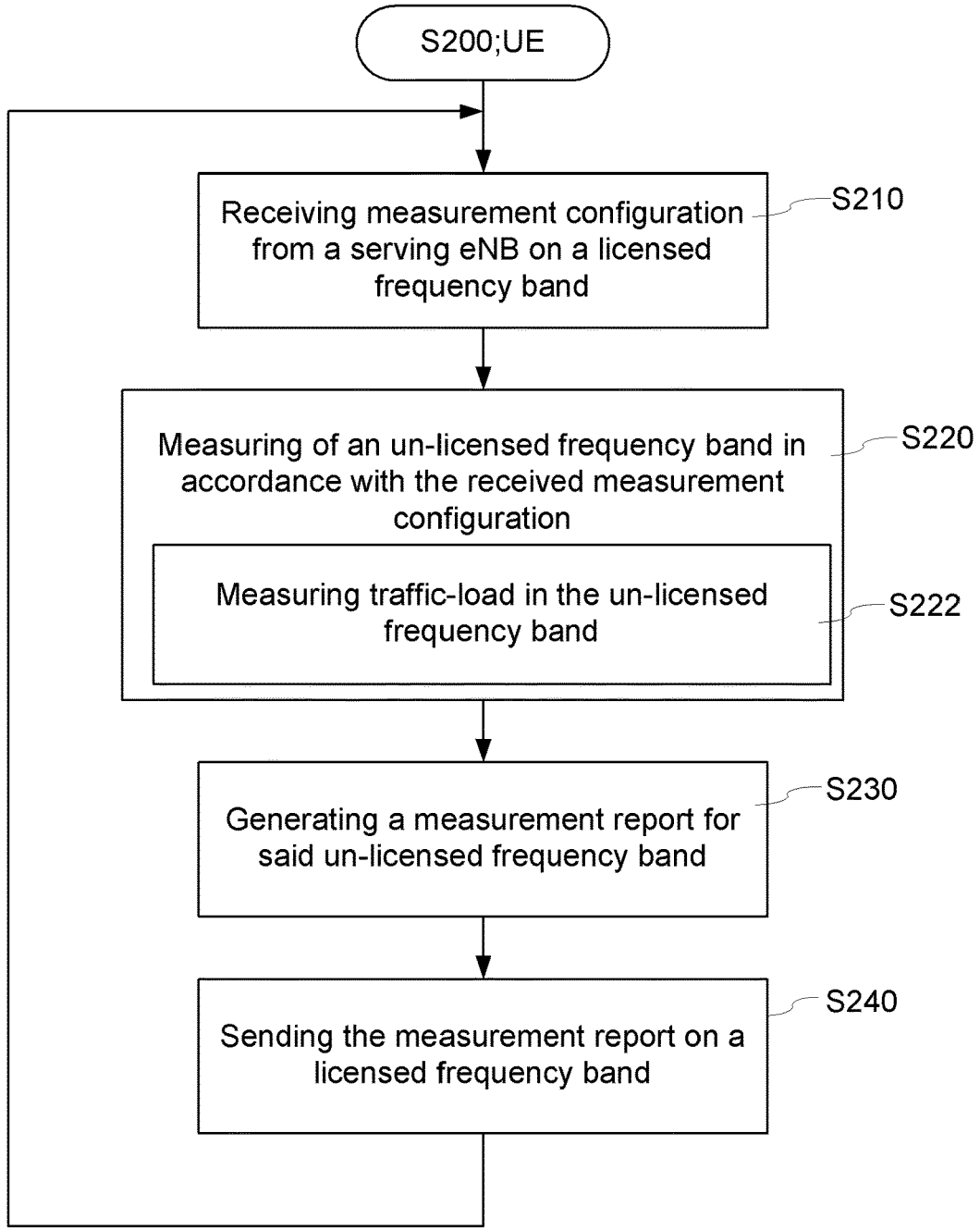
FIG. 7 is a flowchart illustrating an embodiment of the second method.

FIG. 7 is a flowchart illustrating an embodiment of the method for enabling in an LTE system UE assisted measurement of an un-licensed frequency band to be used for at least one downlink carrier. The embodiment comprises steps S210, S220, S230 and S240 of the method in the UE as described above FIG. 6. The present embodiment comprises a step S222 in step S220:

S222:—Measuring traffic-load in the un-licensed frequency band.

The traffic-load may for example be measured during a measurement period, wherein multiple measurement samples may be registered, The UE counts how many times the surrounding system are measured. Then the ratio of measured vs total times could be regarded as the traffic-load of the systems on the band.

Figure 8:
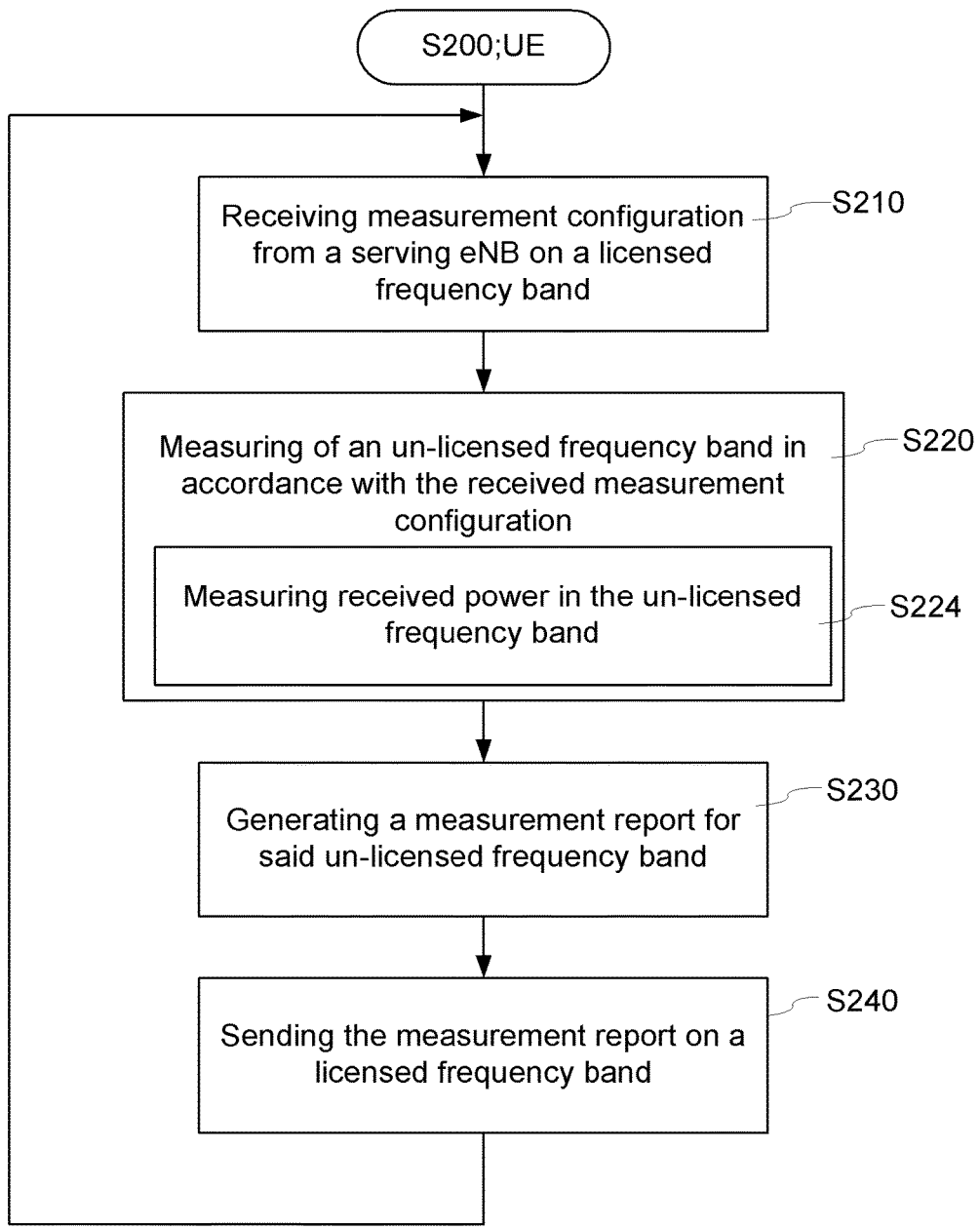
FIG. 8 is a flowchart illustrating an alternative embodiment of the second method.

FIG. 8 is a flowchart illustrating an alternative embodiment of the method S200. Said method is an alternative embodiment to the embodiment comprising the step S222. Instead of said step S222, said embodiment comprises a step S224:

S224:—Measuring received power in the un-licensed frequency band.

Herein, two ways of measuring the received power are mentioned. If the system is known by the UE, then the UE could measure the Reference Signal Received Power, RSRP, of that system.

If the system is unknown by the UE, the UE could measure the energy level of the frequency band using energy detection, then the energy detected could be regarded as the received power.

According to one embodiment of method S200, step S210 may comprise:

receiving measurement configuration from a serving eNB on a licensed frequency band via System Information Block, SIB, signalling, layer 1, or Radio Resource Control in the licensed frequency band.

The technique may be implemented in digital electronically circuitry, or in computer hardware, firmware, software, or in combinations of them. Apparatus of the technique may be implemented in a computer program product tangibly embodied in a machine readable storage device for execution by a programmable processor; and method steps of the technique may be performed by a programmable processor executing a program of instructions to perform functions of the technique by operating on input data and generating output.

The technique may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such internal hard disks and removable disks; magneto-optical disks; and CD-ROM (Compact Disc Read-Only Memory) disks. Any of the foregoing may be supplemented by, or incorporated in, specially-designed ASICs (Application Specific Integrated Circuits).

Figure 9:
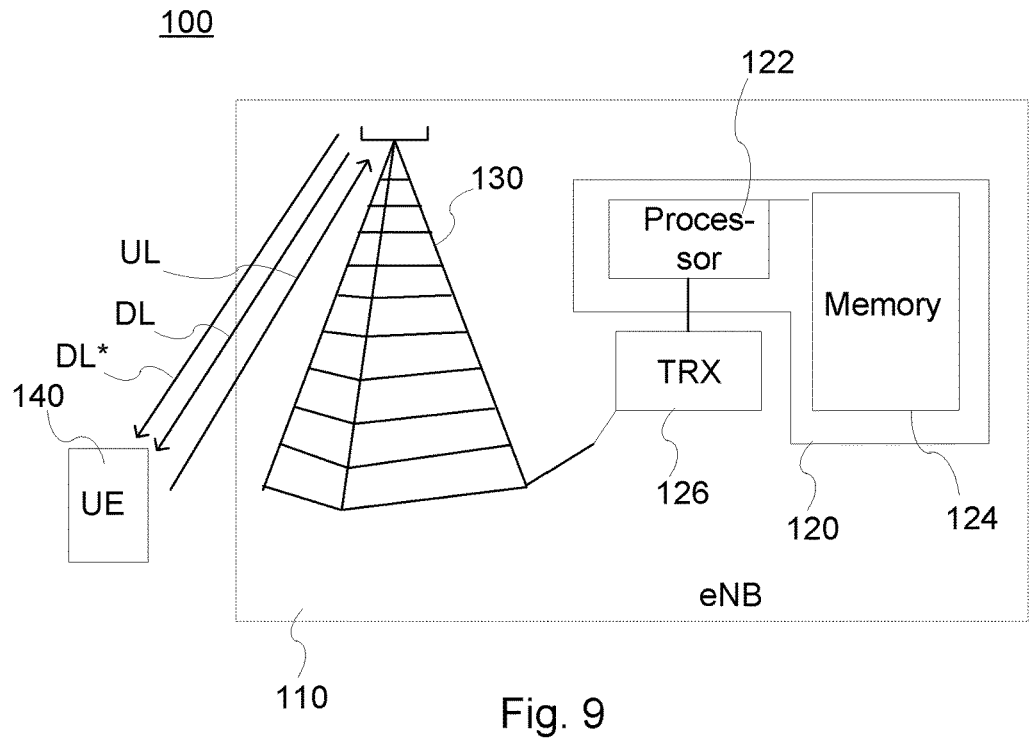
FIG. 9 is a block-diagram illustrating an exemplified LTE eNB wherein the first method is implemented.

FIG. 9 is a block-diagram illustrating an eNB 110 of an LTE system 100 capable of serving UEs 140.

The LTE eNB 110 is capable of serving a plurality of UEs 140. Each UE 140 is a wireless device for radio communication handled by a user.

The LTE eNB 110 comprises a transceiver, TRX, 126 for sending and receiving signalling over links/channels/carriers, down-link DL and up-link UL, between the eNB and each UE within its coverage area, i.e. cell, by means of an antenna 130, which may be a set of antennas, e.g. an antenna array. The LTE eNB further comprises a processing circuitry 120. The processing circuitry 120 comprises a processor 122 and a memory 124. The memory is containing instructions executable by said processor 122.

It is further illustrated in FIG. 9, a schematic block diagram of a UE 140.

The eNB 110 of an LTE system is capable of serving a plurality of UEs. Each UE is a wireless device for radio communication handled by a user.

The UE 140 comprises a transceiver, TRX, 156 for sending and receiving signalling over links between a serving eNB 110 and the UE 140 within its coverage area, i.e. cell. The eNB further comprises a processing circuitry 150. The processing circuitry 150 comprises a processor 152 and a memory 154. The memory is containing instructions executable by said processor 152.

The transceiver 156 is also provided with a measuring unit 158 for enabling measurement of different frequency bands, both in licensed and un-licensed frequency bands. Said measuring unit 158 may be used for performing step S220 in method S200.

The eNB of an LTE system is adapted to enable the use of a downlink carrier, DL*, of an un-licensed frequency band together with uplink and downlink carriers UL, DL in the licensed frequency band in accordance with Carrier Aggregation. The processing circuitry 120 of said eNB is operative to perform steps of the method S100, i.e.:
  determine a measurement configuration for at least one UE served by the eNB;
  send on a licensed frequency band the measurement configuration to said at least one user equipment;
  receive on the licensed frequency band a measurement report from the at least one UE;
  decide to use the downlink carrier based on the received measurement result.

The processing circuitry 120 may according to one embodiment be adapted to decide to use the downlink carrier if the received measurement report regarding traffic load in the un-licensed frequency band is less than a predetermined threshold value.

According to an alternative embodiment, the processing circuitry 120 may be operative to decide to use the downlink carrier if the received measurement report regarding received power in the un-licensed frequency band is less than a predetermined threshold value.

The processing circuitry 120 may in some embodiments be operative to use adapted fractional loading of the downlink carrier based on the received measurement report.

The processing circuitry 120 may further be operative to configure an active subframe ratio of the downlink carrier for each UE in dependence of measured interference from surrounding radio systems.

The processing circuitry 120 may further be adapted to handle measurement configuration comprising information on which UE should be configured to perform measurement and/or the un-licensed frequency band of interest and/or measurement period and/or measurement system type and/or report type. The measurement configuration may be sent periodically or based on the eNB's traffic load and/or received power in the un-licensed frequency band.

The processing circuitry 120 may further be operative to send the measurement configuration to the at least one UE via System Information Block (SIB) signalling, layer 1, or via Radio Resource Control (RRC) signalling in the licensed frequency band.

The measurement report, sent from an UE, comprises information on detected system type, on which un-licensed band measurement concerns and its corresponding interference power on the un-licensed frequency band to the eNB. The measurement reports are sent from UEs and received by the eNB 110 periodically, or as a result of a triggering event of a UE.

Figure 10:
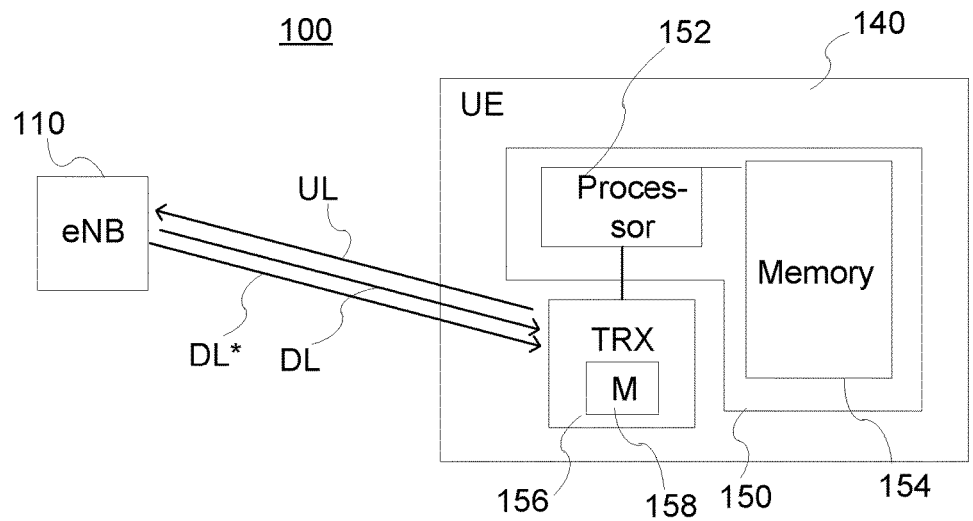
FIG. 10 is a block-diagram illustrating an exemplified UE wherein the second method is implemented.

FIG. 10 is a schematic block diagram of a UE 140 for implementing the proposed method S200.

The UE 140 is served by an eNB 110 of an LTE system 100. Each UE is a wireless device for radio communication handled by a user.

The UE 140 comprises a transceiver, TRX, 156 for sending and receiving signalling over links between a serving eNB 110 and the UE 140 within its coverage area, i.e. cell. The eNB further comprises a processing circuitry 150. The processing circuitry 150 comprises a processor 152 and a memory 154. The memory is containing instructions executable by said processor 152.

The transceiver 156 is also provided with a measuring unit 158 for enabling measurement of different frequency bands, both in licensed and un-licensed frequency bands, as discussed above regarding step S220 in method S200.

The UE 140 is adapted for performing UE assisted measurement of an un-licensed frequency band in an LTE system. The object for measuring un-licensed frequency bands is to determine if any frequency band is possible to be used for at least one downlink carrier. Said UE comprises a processing circuitry 150 being operative to:
  receive measurement configuration from a serving eNB on a licensed frequency band;
  measure of the un-licensed frequency band in accordance with the received measurement configuration;
  generate a measurement report for said un-licensed frequency band;
  send the measurement report on a licensed frequency band.

The measurement configuration may comprise information indicating which un-licensed frequency band to be measured and/or measurement period and/or measurement system type and/or report type. The measurement configuration is received periodically or based on the eNB's traffic load and/or received power in the un-licensed frequency band.

The processing circuitry 150 is operative to receive the measurement configuration via SIB signalling, layer 1, or via RRC signalling in the licensed frequency band.

The measurement report comprises information on detected system type, on which un-licensed frequency band measurement concerns and its corresponding interference power on the un-licensed frequency band to the eNB. The measurement report is sent periodically or as a result of a triggering event of the UE.

According to one embodiment, the processing circuitry 150 is operative to measure traffic load in the un-licensed frequency band.

According to an alternative embodiment of the UE, the processing circuitry 150 is operative to measure received power in the un-licensed frequency band.

Figure 11:
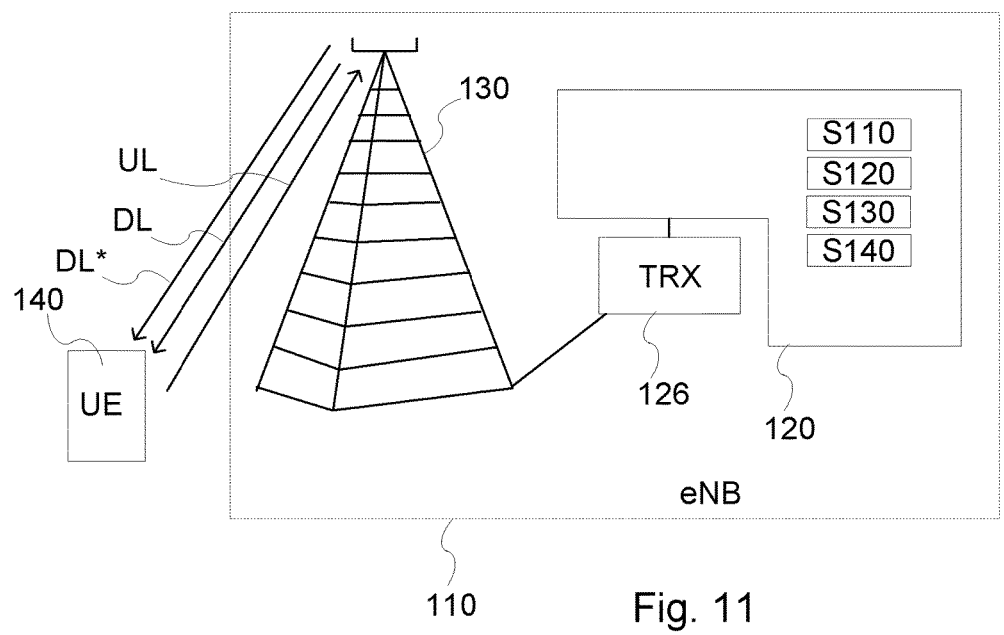
FIG. 11 is a block-diagram illustrating another example of an LTE eNB wherein the first method is implemented.

FIG. 11 is a block-diagram illustrating an alternative embodiment of an eNB 110 of an LTE system 100.

The eNB 110 is capable of serving a plurality of User Equipments, UEs, 140. Each UE 140 is a wireless device for radio communication handled by a user.

The eNB 110 comprises a transceiver, TRX, 126 for sending and receiving signalling over links/channels/carriers, down-link DL and up-link UL, between the eNB and each UE within its coverage area, i.e. cell, by means of an antenna 130, which may be a set of antennas, e.g. an antenna array. The eNB further comprises a processing circuitry 120. The processing circuitry 120 comprises a processor 122 and a memory 124. The memory is containing instructions executable by said processor 122.

The eNB 110 of an LTE system is capable of serving a plurality of User Equipments, UEs. Each UE is a wireless device for radio communication handled by a user.

Figure 12:
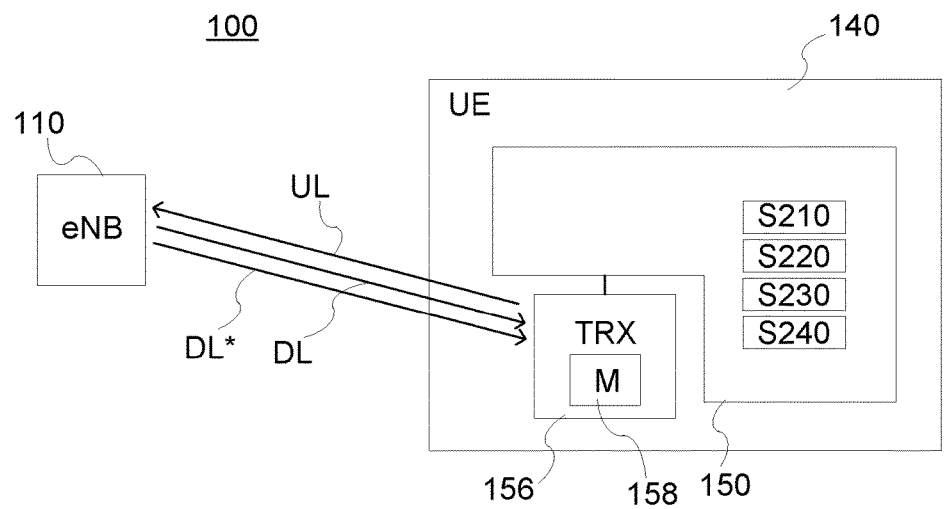
FIG. 12 is a block-diagram illustrating another example of an UE wherein the second method is implemented.

FIG. 12 is a block-diagram illustrating an alternative embodiment of a UE 140 of an LTE system 100.

The UE 140 comprises a transceiver, TRX, 156 for sending and receiving signalling over links between a serving eNB 110 and the UE 140 within its coverage area, i.e. cell. The eNB further comprises a processing circuitry 150. The processing circuitry 150 comprises a processor 152 and a memory 154. The memory is containing instructions executable by said processor 152.

The transceiver 156 is also provided with a measuring unit 158 for enabling measurement of different frequency bands, both in licensed and un-licensed frequency bands.

The eNB of the LTE, system is adapted to enable the use of a downlink carrier, DL, of an un-licensed frequency band. The processing circuitry 120 of said eNB is operative to perform steps of the method S100, and embodiments thereof, e.g.:

S110:—determining a measurement configuration for at least one UE served by the eNB;
S120:—sending on a licensed frequency band the measurement configuration to said at least one user equipment;
S130:—receiving on the licensed frequency band a measurement report from the at least one UE;
S140:—deciding to use a downlink carrier of an un-licensed frequency band based on the received measurement result.

The eNB 110 may alternatively comprise:
means for determining or a unit adapted to determine a measurement configuration for at least one UE served by the eNB;
means for sending or a unit adapted to send on a licensed frequency band the measurement configuration to said at least one user equipment;
means for receiving or a unit adapted to receive on the licensed frequency band a measurement report from the at least one UE;
means for deciding or a unit adapted to decide to use a downlink carrier of an un-licensed frequency band based on the received measurement result.

Further, an embodiment of a UE 140 is illustrated in FIG. 13.

It is further illustrated in FIG. 12, a schematic block diagram of a UE 140.

The UE 140 is adapted for performing UE assisted measurement of an un-licensed frequency band in an LTE system. The object for measuring un-licensed frequency bands is to determine if any frequency band is possible to be used for at least one downlink carrier. Said UE comprises a processing circuitry 150 being operative to perform steps of the method S200, and its embodiments, e.g.:

S210:—receiving measurement configuration from a serving eNB on a licensed frequency band;
S220:—measuring of the un-licensed frequency band in accordance with the received measurement configuration;
S230:—generating a measurement report for said un-licensed frequency band; and
S240:—sending the measurement report on the licensed frequency band.

In the enclosed drawings, the memory 124, 154 of the respective processing circuits 120, 150 is indicated as one single data storage unit. It is understood that in different embodiments and implementation, the memory may comprise different number of storage areas, and the illustrated number of data storage areas only is for illustrative purposes. One or several of the data storage areas may be physically separated from other data storage areas, or may reside on the same physical media.

The UE 140 may alternatively comprise:
means for receiving or a unit adapted to receive measurement configuration from a serving eNB on a licensed frequency band;
means for measuring or a unit 158 adapted to measure of the un-licensed frequency band in accordance with the received measurement configuration;
means for generating or a unit adapted to generate measurement report for said un-licensed frequency band; and
means for sending or a unit adapted to send the measurement report on the licensed frequency band.

The entities and units described above with reference to FIGS. 9, 10, 11 and 12 are logical and/or physical units, and do not necessarily correspond to separate physical units. Thus, the person skilled in the art would appreciate that the units disclosed in said figures may be implemented as physically integrated units, and/or physically separate units, and that the units are provided with appropriate processing circuits.

A number of embodiments of the present technique have been described. It will be understood that various modifications may be made without departing from the scope of the technique. Therefore, other implementations are within the scope of the following claims defining the technique.

The invention claimed is:

1. A method performed by an evolved Node B, eNB, of a Long Term Evolution system for enabling the use of a downlink carrier of an un-licensed frequency band, said method comprises:

determining a measurement configuration for at least one user equipment, UE, served by the eNB;

sending on a licensed frequency band the measurement configuration to said at least one UE;

receiving on the licensed frequency band a measurement report from the at least one UE;

deciding to use a downlink carrier of an un-licensed frequency band based on the received measurement report; and using adapted fractional loading of the downlink carrier of the un-licensed frequency band based on the received measurement report, wherein an active subframe ratio of the downlink carrier for each UE of the at least one UE is configured in dependence of measured interference from surrounding radio systems.

2. The method according to claim 1, wherein the deciding step comprises:

deciding to use the downlink carrier of an un-licensed frequency band if the received measurement report regarding traffic load in the un-licensed frequency band is less than a predetermined threshold value; or deciding to use the downlink carrier of an un-licensed frequency band if the received measurement report regarding received power in the un-licensed frequency band is less than a predetermined threshold value.

3. The method according to claim 2, wherein the measurement configuration comprises information on which UE should be configured to perform measurement on the un-licensed frequency band.

4. The method according to claim 2, wherein the received measurement report comprises information on detected system type, on which un-licensed frequency band measurement concerns and its corresponding interference power on the un-licensed frequency band.

5. An evolved Node B, eNB, of a Long Term Evolution system for enabling the use of a downlink carrier of an un-licensed frequency band, said eNB comprising processing circuitry operative to:

determine a measurement configuration for at least one UE served by the eNB;

send on a licensed frequency band the measurement configuration to said at least one user equipment;

receive on the licensed frequency band a measurement report from the at least one UE;

decide to use the downlink carrier of an un-licensed frequency band based on the received measurement report and using adapted fractional loading of the downlink carrier of the un-licensed frequency band based on the received measurement report, wherein an active subframe ratio of the downlink carrier for each UE of the at least one UE is configured in dependence of measured interference from surrounding radio systems.

6. The eNB according to claim 5, wherein the processing circuitry is operative to:

decide to use the downlink carrier of an un-licensed frequency band if the received measurement report regarding traffic load in the un-licensed frequency band is less than a predetermined threshold value; or decide to use the downlink carrier of an un-licensed frequency band if the received measurement report regarding received power in the un-licensed frequency band is less than a predetermined threshold value.

7. The eNB according to claim 6, wherein the measurement configuration comprises information on which UE should be configured to perform measurement on the un-licensed frequency band of interest.

8. The eNB according to claim 6, wherein the measurement configuration is sent periodically or based on the eNB's traffic load and/or received power in the un-licensed frequency band.

* * * * *